(12) United States Patent
Cormack et al.

(10) Patent No.: US 7,194,625 B2
(45) Date of Patent: Mar. 20, 2007

(54) METHOD AND APPARATUS FOR AUTHENTICATING REGISTRY INFORMATION

(75) Inventors: Christopher J. Cormack, Hillsboro, OR (US); Jeff R. Jackson, Newberg, OR (US); Jeremy A. White, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 907 days.

(21) Appl. No.: 09/885,234

(22) Filed: Jun. 19, 2001

(65) Prior Publication Data
US 2002/0194488 A1     Dec. 19, 2002

(51) Int. Cl.
*H04L 9/00* (2006.01)

(52) U.S. Cl. .......................... 713/168; 726/2; 713/168; 713/169; 713/170; 713/100

(58) Field of Classification Search ................ 713/200, 713/168–170, 176; 726/2
See application file for complete search history.

(56) References Cited

U.S. PATENT DOCUMENTS

| 5,694,471 | A | * | 12/1997 | Chen et al. ..................... 705/76 |
| 5,809,230 | A | * | 9/1998 | Pereira ........................ 713/200 |
| 6,263,348 | B1 | * | 7/2001 | Kathrow et al. ............ 707/203 |
| 6,281,894 | B1 | * | 8/2001 | Rive ........................... 715/705 |
| 6,779,117 | B1 | * | 8/2004 | Wells ......................... 713/200 |

OTHER PUBLICATIONS

Randy Franklin Smith, Windows IT Pro,May 1999, Windows IT Pro, InstantDoc # 5188, retrieved date Mar. 16, 2005;☐☐http://www.windowsitpro.com/Article/ArticleID/5188/5188.html.*

Clausen, Simon, "Windows Registry FAQ", www.winguides.com/article.php?, May 17, 2001.
"Windows Registry Guide, The Structure of the Registry", www.winguides.com/article.php?, May 17, 2001.
"Windows Registry Guide, Editing the Registry", www.winguides.com/article.php?, May 17, 2001.
"Windows Registry Guide, Importing and Exporting Registry Settings", www.winguides.com/article.php?, May 17, 2001.
"Windows Registry Guide, Maintaining the Registry", www.winguides.com/article.php?, May 17, 2001.
Bard, Joan, "The Windows Registry", www.microsoft.com/technet/win98/reg.asp, May 17, 2001.
*Mystery Behind Windows Registry*, whitepaper by Shrishail Rana.

* cited by examiner

*Primary Examiner*—Gilberto Barrón, Jr.
*Assistant Examiner*—Samson Lemma
(74) *Attorney, Agent, or Firm*—Blakely, Sokoloff, Taylor & Zafman LLP

(57) ABSTRACT

A method and apparatus for authenticating a Windows® system registry comprising generating and storing a user identity value. The user identity value is generated by inserting a user identity in a one way function. The technique also generates and stores a registry security value corresponding with the system registry. In one embodiment, the registry security value is obtained by concatenating system registry information, for example, system registry files or system registry handle keys, and inserting the concatenated system registry information in a one way function to obtain the registry security value. An application program authenticates the registry information before using the registry information. Alternately, the registry is monitored and a change to the registry is permitted if a user identity value is equal to the stored user identity value.

17 Claims, 4 Drawing Sheets

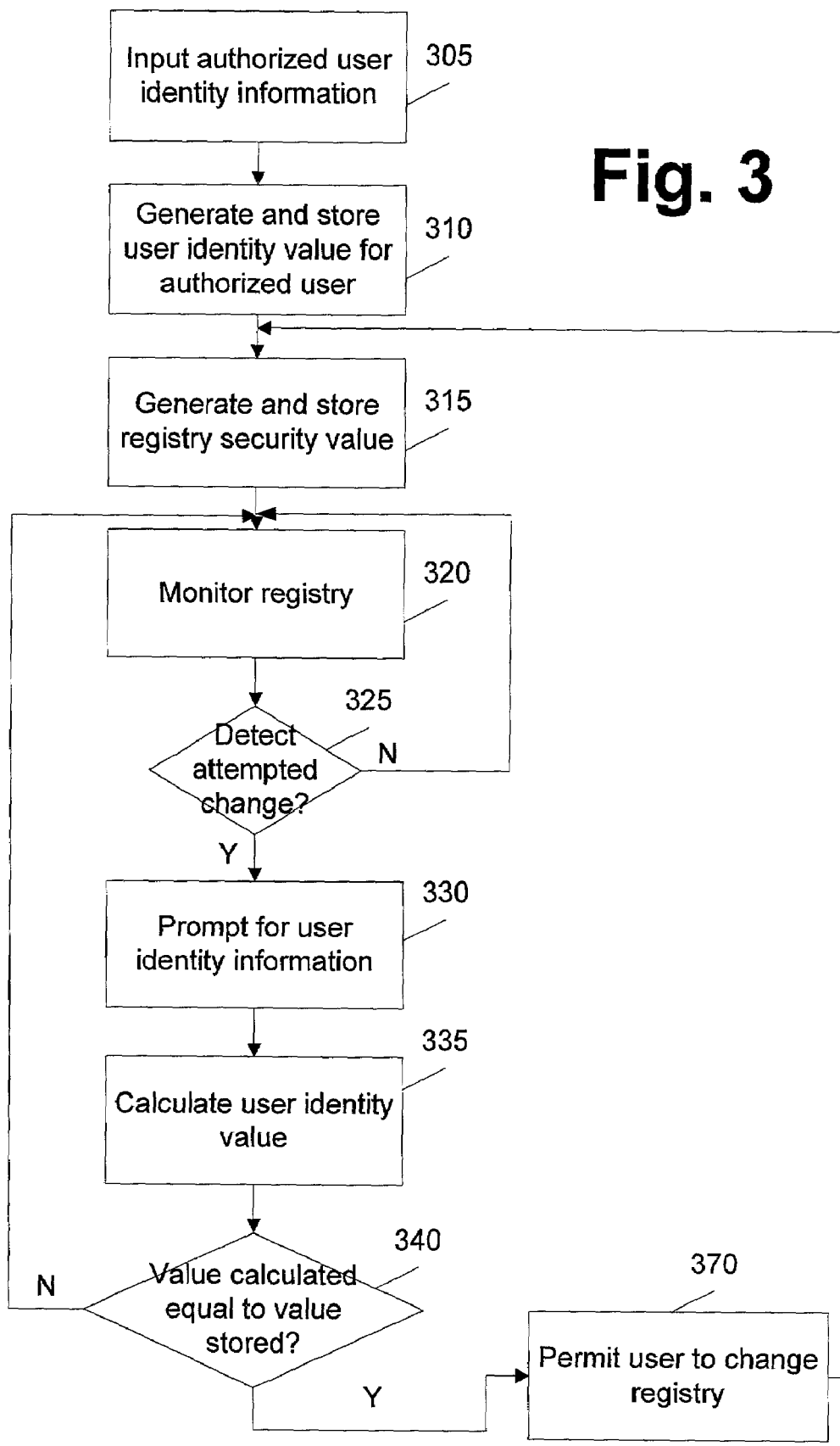

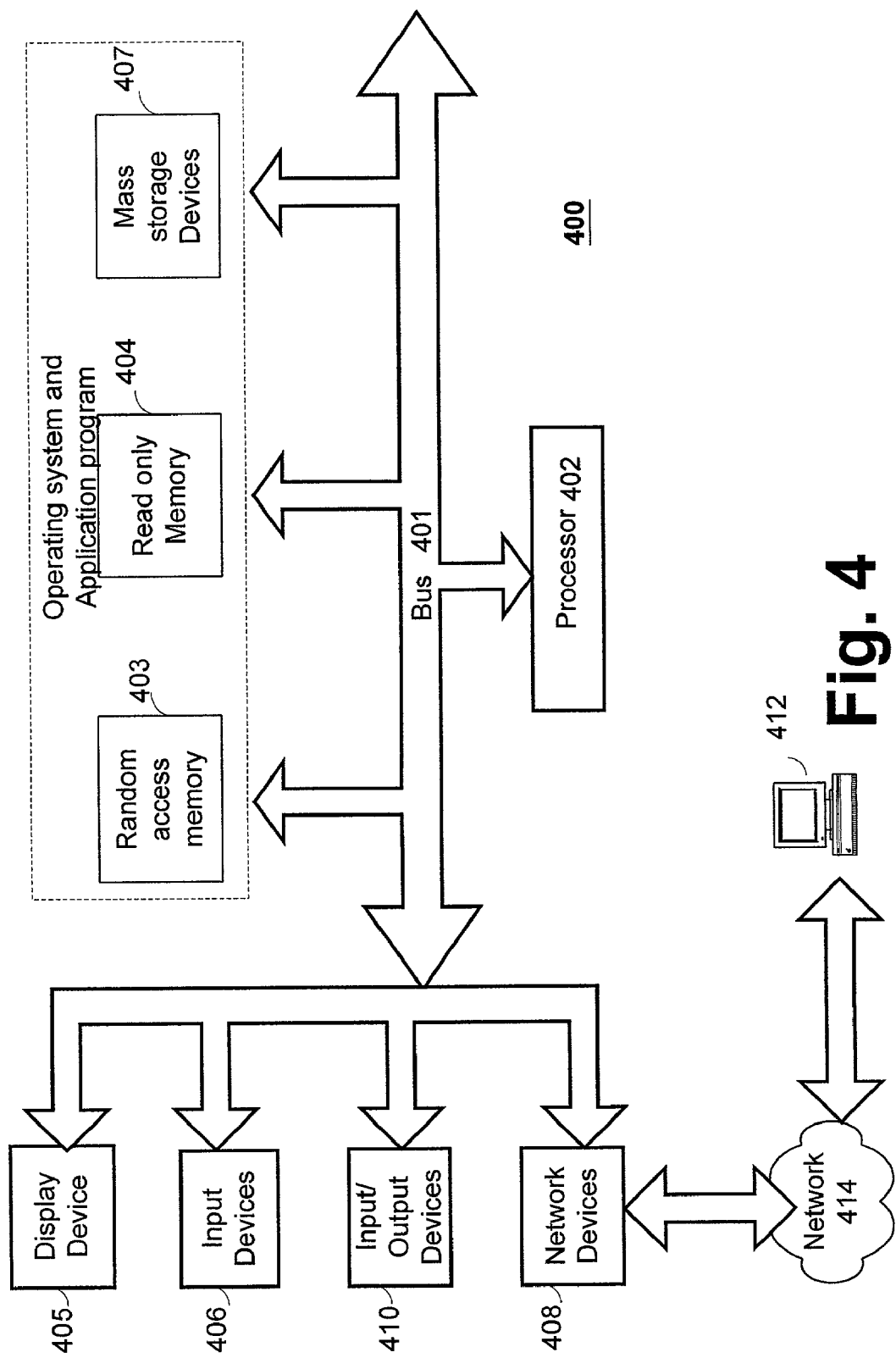

METHOD AND APPARATUS FOR AUTHENTICATING REGISTRY INFORMATION

BACKGROUND

1. Field of the Invention

The present invention is related to the field of computers. In particular, the present invention is related to a method and apparatus for authenticating registry information.

2. Description of the Related Art

The registry of an operating system, for example, the system registry in the Microsoft® Windows® operating system is a set of data files that stores settings and options for the Windows operating system. The system registry contains information and settings for the hardware, software, and user preferences for a machine, e.g., a computer. The system registry comprises a set of data files used to help the Windows operating system control the computer's hardware, software, and the user preferences.

System registry information in the Microsoft Windows operating system is contained in two files, system.dat and user.dat, located in the Windows directory. The system registry has a hierarchical structure, and may be accessed and edited using a program called regedit.exe that is located in the Windows directory. When editing the system registry, system registry entries are displayed using handle keys. In the Window's system registry there are six handle keys: HKEY_CLASSES_ROOT, HKEY_CURRENT_USER, HKEY_LOCAL_MACHINE, HKEY_USERS, HKEY_CURRENT_CONFIG, and HKEY_DYN_DATA. Each handle key stores a specific portion of the information stored in the registry. For example, the HKEY_LOCAL_MACHINESOFTWARE handle key stores settings for all 32-bit software applications installed on a computer. Control functions for software applications may be listed in the sub-keys associated with, for example, the HKEY_LOCAL_MACHINESOFTWARE handle key, or the HKEY_CURRENT_USER handle key.

In addition to the hardware and software configuration and control functions, certain software applications may use the system registry to store the Uniform Resource Locators (URLs) or other web-site information, based on which a user may either be permitted or prohibited from accessing web-sites. Because of the importance of the information stored in the registry, it is necessary to at least detect unauthorized changes to the system registry.

BRIEF SUMMARY OF THE DRAWINGS

Examples of the present invention are illustrated in the accompanying drawings. The accompanying drawings, however, do not limit the scope of the present invention. Similar references in the drawings indicate similar elements.

FIG. 3 illustrates another embodiment of a flow diagram for authenticating a system registry.

FIG. 4 illustrates one embodiment of an apparatus for authenticating a system registry.

DETAILED DESCRIPTION

Figure 1:
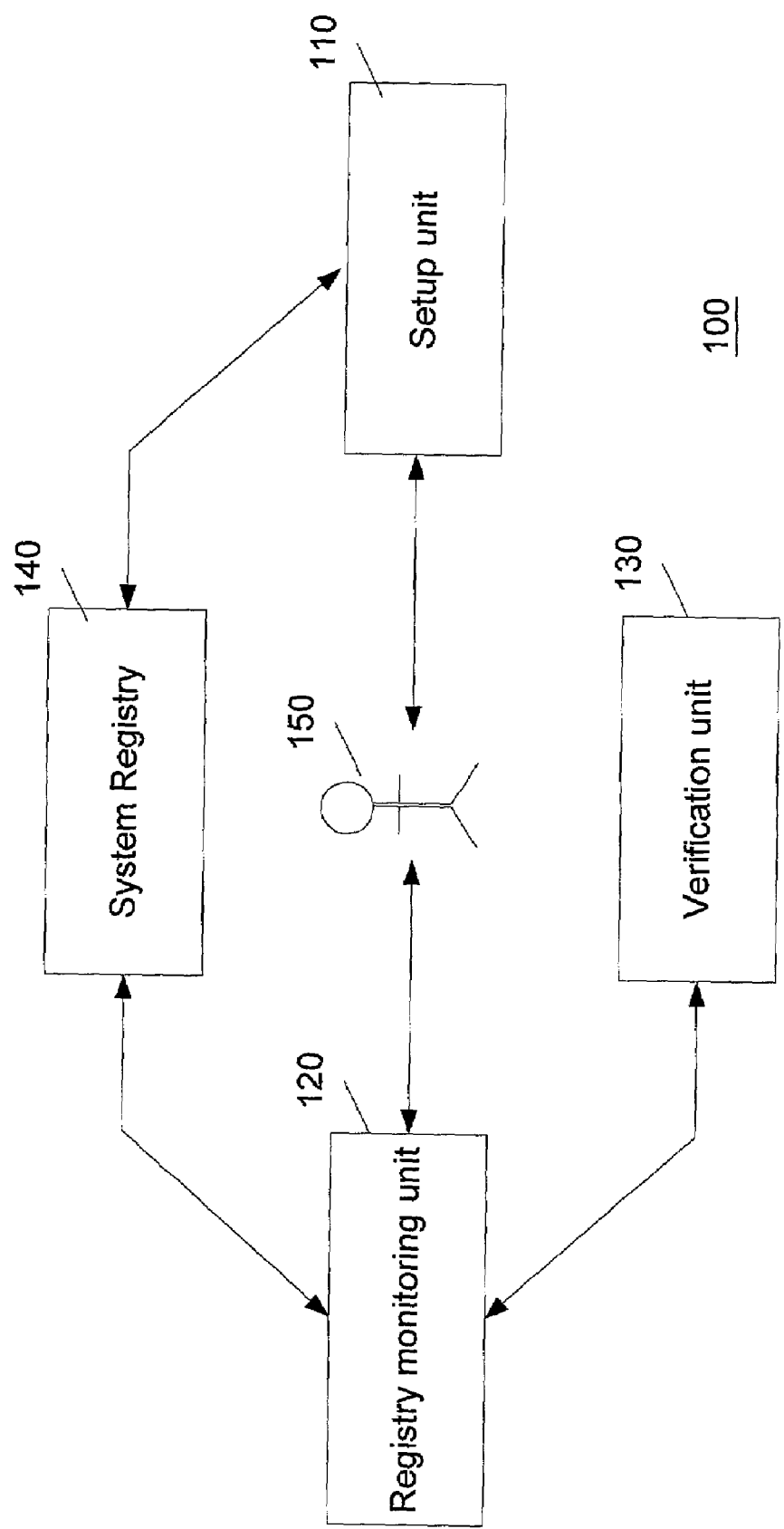
FIG. 1 illustrates a block diagram of one embodiment of a system registry authenticating unit.

Described is a method and apparatus for authenticating a Windows® system registry. Although the method and apparatus disclosed herein describes a technique for authenticating a Windows® system registry, the technique disclosed may be used to authenticate any registry which comprises files used by an operating system to control a machine's operation. The technique disclosed herein generates and stores a user identity value corresponding with a user identity. The user identity value is generated by inserting the user identity in a one way function. The invention also generates and stores a registry security value corresponding with the system registry. In one embodiment, the registry security value is obtained by optionally concatenating system registry information, for example, system registry files or system registry handle keys, and inserting the concatenated system registry information in a one way function to obtain the registry security value.

In one embodiment, each time an application reads the system registry information, the system registry is authenticated by generating a new registry security value and comparing the new registry security value with the registry security value that was obtained and stored earlier. In an alternate embodiment, the registry is monitored and a change to the registry is permitted if the value corresponding with a user identity value is equal to the stored user identity value, and the value corresponding with the registry security value is equal to the stored registry security value.

In the following description numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid obscuring the present invention.

The invention may utilize a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, a home, enterprise-wide computer networks, and the global Internet.

In addition, it should be understood that the programs, processes, method, etc. described herein are not related or limited to any particular computer or apparatus nor are they related or limited to any particular communication network architecture. Rather, various types of general purpose machines, wired or wireless, may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in a nonvolatile memory such as read only memory. Lastly, repeated usage of the phrase "in one embodiment" does not necessarily refer to the same embodiment, although it may.

FIG. 1 illustrates a block diagram of one embodiment of a registry authenticating unit. The registry authenticating unit 100 comprises a setup unit 110, an optional registry monitoring unit 120, and a verification unit 130. The setup unit 110 prompts a user 150 for identity information, e.g., a username and password. The setup unit 110 inputs the username and password into a function, e.g., a one way function to obtain a user identity value. One skilled in the art will appreciate that using a one way function to obtain a user identity value makes it virtually impossible to obtain the information input into the function, e.g., the username and password, given only the user identity value. The setup unit 110 may store the user identity value either locally, on the machine containing the registry 140, or remotely, e.g., on a server. Although the technique describes the use of a username and password to obtain a value for authenticating a user, other forms of identity such as smart cards, digital certificates, and bio-identities, e.g., fingerprints, retinal scans, etc. may also be used to authenticate a user. The setup unit reads the system registry information and optionally concatenates the system registry information. In one embodiment, the setup unit may concatenate the files comprising the system registry 140. In alternate embodiments, the setup unit may concatenate at least a part of the handle keys contained in the files comprising the system registry 140. The concatenated system registry information is input into a function, for example, a one way function, to obtain a registry security value. In one embodiment, the same function is used to calculate the user identity value and the registry security value. Alternate embodiments may use different functions to calculate the user identity value and the registry security value. The generated registry security value is then stored.

Once the user identity value and the registry security value are generated and stored, an application that reads the system registry information authenticates the system registry using Verification unit 130, prior to using the information contained in the system registry. Authenticating the system registry comprises obtaining a new registry security value and comparing the new registry security value with the stored registry security value. In one embodiment, if a change in the new and stored registry security value is detected, the application decides how to handle the change. For example, a new user identity value may be obtained by prompting the user for a username and password and comparing the new user identity value with the stored user identity value. Only if the two user identity values match, is processing permitted to continue.

In an alternate embodiment, the optional registry monitoring unit 120 monitors the system registry 140 for any attempted changes to the system registry 140. If either a program or a user attempts to change the system registry information, for example, by opening a system registry file, or by deleting or changing the system registry handle keys, the registry monitoring unit 120 prompts the user for identification information. In one embodiment, the technique contemplates selectively choosing particular components of the system registry for monitoring, and requests the user for identity information if an attempt is made to change the components of the system registry that are selected for monitoring. In alternate embodiments, the invention contemplates providing the user with a switch to turn off requests for identity information when a program known to the user attempts to access the system registry.

In one embodiment, when an attempt is made to change the system registry information, processing, including write attempts to the system registry are suspended until the authenticating unit 130 has authenticated the user 150. In alternate embodiments, a message indicating an attempt to change the registry may be logged locally in a database or sent to a superior, for example, a network administrator informing the network administrator of the attempt.

The registry monitoring unit 120, on receiving the user identity information sends the user identity information to verification unit 130. Verification unit 130 inputs the user identity information into the function that was used by the setup unit 110, and obtains a new user identity value. The verification unit 130 retrieves the user identity value stored by the setup unit 110, and compares the stored user identity value with the new user identity value.

If the two values are dissimilar, in one embodiment, verification unit 130 determines how to proceed after detecting the change. For example, the verification unit 130 may decide after a configurable number of unsuccessful attempts at providing the user identity information, a user if connected to a network may be logged off the network. Alternately, the keyboard may be temporarily disabled and the user prevented from further input of data, thus denying access to the registry.

However, if the new user identity value and the user identity value stored by setup unit 110 are identical, the verification unit optionally concatenates the system registry information in the same order that was concatenated by the setup unit 110. The concatenated system registry information is input into the function that was used by the setup unit to obtain the stored registry security value, and a new registry security value is obtained. In one embodiment, the function used to obtain user identity values is the same function that is used to obtain the registry security values. The verification unit 130 then compares the new registry security value with the registry security value previously stored by the setup unit. If the two values are identical, then the verification unit permits the user to make changes to the system registry.

In one embodiment, each time a machine boots up, the system registry information is authenticated in accordance with the procedure disclosed above. This prevents a user from copying system registry files created elsewhere and using the copied system registry files on a machine that is protected by the technique disclosed above.

Figure 2:
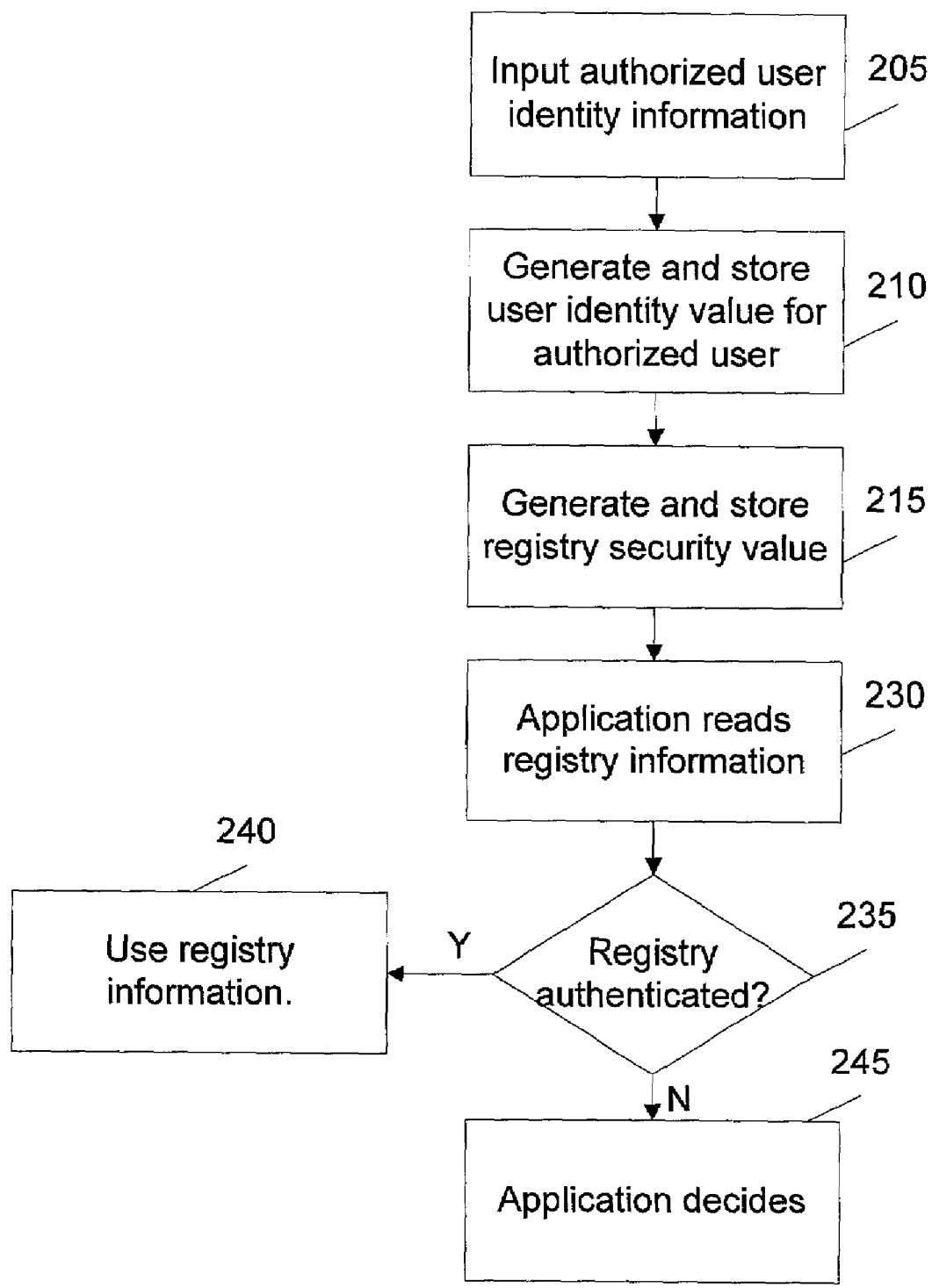
FIG. 2 illustrates one embodiment of a flow diagram for authenticating a system registry.

Various operations will be described as multiple discrete steps performed in turn in a manner that is helpful in understanding the present invention. However, the order of description should not be construed as to imply that these operations are necessarily performed in the order they are presented, or even order dependent. FIG. 2 illustrates one embodiment of a flow diagram for authenticating a system registry. At 205, a user that is authorized to setup and make changes to a system registry is prompted for user identity information. At 210, the user identity information is input into a function, e.g., a one way function to obtain a user identity value. The user identity value may be stored either locally on the machine containing the registry, or remotely.

At 215, optionally, the information contained in the system registry may be concatenated in a particular order. In one embodiment, the system registry files may be concatenated, in alternate embodiments at least a part of the system registry handle keys may be concatenated. The concatenated system registry information is input into a function, e.g., a one way function to obtain a registry security value. One skilled in the art will appreciate that methods other than concatenation may be used prior to inserting the registry information into a function. For example, the letters in the system registry may be converted into their ascii equivalents and summed prior to inserting summed values of the strings into a one-way function. The obtained registry security value may be stored either locally on the machine containing the registry or remotely, e.g., on a server.

At 230, an application program reads the system registry information. Prior to using the system registry information the application program authenticates the system registry at 235. Authenticating the system registry comprises obtaining a new registry security value and comparing the new registry security value with the stored registry security value. At 240, if the new registry security value is equal to the stored registry security value, the registry information that was read at 230 is used by the application program and processing continues. If a change between the new and stored registry security value is detected, at 245, the application decides how to handle the change. For example, the user may be authenticated. Authenticating the user comprises obtaining a new user identity value and comparing the new user identity value with the stored user identity value. If the new user identity value is equal to the stored user identity value, a change may be allowed to the registry information. However, if the new user identity value is not equal to the stored user identity value processing may end.

FIG. 3 illustrates one embodiment of a flow diagram for authenticating a system registry. At 305, a user that is authorized to setup and make changes to a system registry is prompted for user identity information. At 310, the user identity information is input into a function, e.g., a one way function to obtain a user identity value. The user identity value may be stored either locally on the machine containing the registry, or remotely. At 315, optionally, the information contained in the system registry is concatenated in a particular order. In one embodiment, the system registry files may be concatenated, in alternate embodiments the system registry handle keys may be concatenated. The concatenated system registry information is input into a function, e.g., a one way function to obtain a registry security value. The obtained registry security value may be stored either locally on the machine containing the registry or remotely, e.g., on a server. At 320, the system registry is monitored for attempts to change the system registry information.

At 325, an attempt to change the system registry is detected. Various methods may be used to detect an attempt to change the system registry. In one embodiment, an attempt to open a system registry file may be detected as an attempt to change the system registry. If an attempt to change the system registry is detected, at 330 the user of the machine is prompted for identity information in order to be authenticated. Other operations associated with the machine may be suspended during the time the user is authenticated. After receiving the identity information, at 335, the identity information is input into the function that calculated the user identity value at 310 earlier, and a new user identity value is obtained. At 340, the new user identity value is compared with the user identity value calculated at 310. If the two values differ, in one embodiment, the change to the system registry is disallowed and monitoring of the system registry continues at 320.

However, if the new user identity value is equal to the user identity value calculated at 310, the attempted change to the system registry is permitted at 370. Thereafter, a new registry security value is generated and stored as illustrated earlier, and the process continues at 315.

The detailed description is represented largely in terms of processes and symbolic representations of operations by conventional computer components, including a local processing unit, memory storage devices for the local processing unit, display devices, and input devices. Furthermore, these processes and operations may utilize conventional computer components in a heterogeneous distributed computing environment, including remote file servers, computer servers, and memory storage devices. Each of these conventional distributed computing components is accessible to the local processing unit by a communication network.

In addition, it should be understood that the programs, processes, method, etc. described herein are not related or limited to any particular computer or apparatus nor are they related or limited to any particular communication network architecture. Rather, various types of general purpose machines, wired or wireless, may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in a nonvolatile memory such as read only memory.

In general, such computer systems as illustrated by FIG. 4 includes a processor 402 coupled through a bus 401 to a random access memory (RAM) 403, a read only memory (ROM) 404, and a mass storage device 407. Mass storage device 407 represents a persistent data storage device, such as a floppy disk drive, fixed disk drive (e.g., magnetic, optical, magneto-optical, or the like), or streaming tape drive. Mass storage device 407 may store the program code for authenticating the registry. Processor 402 may be any of a wide variety of general purpose processors or microprocessors (such as the Pentium® processor family manufactured by Intel® Corporation), a special purpose processor, or a specifically programmed logic device.

Processor 402 is operable to receive instructions which, when executed by the processor, cause the processor to generate and store a user identity value corresponding with a user identity. The user identity value is obtained by inserting the user's identity information in a function and obtaining a value. The processor also obtains and stores a registry security value corresponding with the system registry. The value corresponding with the system registry is obtained by concatenating system registry information, for example, the system registry files, or the system registry handle keys, and inserting the concatenated registry information in a function to obtain the registry security value.

When an application program reads the system registry, the processor authenticates the system registry. Authenticating the system registry comprises obtaining a new registry security value and comparing the new registry security value with the stored registry security value. In one embodiment, if a change in the new and stored registry security value is detected, a new user identity value is obtained by asking the user for a username and password and comparing the new user identity value with the stored user identity value. Only if the two user identity values match is processing permitted to continue.

In one embodiment, the system registry is monitored and a change to the system registry is permitted if the user identity value generated for a user is equal to the stored user identity value.

Display device 405 is coupled to processor 402 through bus 401 and provides graphical output for computer system 400. Input devices 406 such as a keyboard or mouse are coupled to bus 401 for communicating information and command selections to processor 402. Also coupled to processor 402 through bus 401 is an input/output interface 410 which can be used to control and transfer data to electronic devices (printers, other computers, etc.) connected to computer system 400. Computer system 400 includes network devices 408 for connecting computer system 400 to one or more networks 414. Network devices 408, may include Ethernet devices including network adapters, phone jacks and satellite links. It will be apparent to one of ordinary skill in the art that other network devices may also be utilized. In one embodiment, the network device 408, may be used to store the user identity value and the registry value at a remote location, for example, on a server.

One embodiment of the invention may be stored entirely as a software product on mass storage 407. Another embodiment of the invention may be embedded in a hardware product, for example, in a printed circuit board, in a special purpose processor, or in a specifically programmed logic device communicatively coupled to bus 401. Still other embodiments of the invention may be implemented partially as a software product and partially as a hardware product.

Embodiments of the invention may be represented as a software product stored on a machine-accessible medium (also referred to as a computer-accessible medium or a processor-accessible medium). The machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data. Those of ordinary skill in the art will appreciate that other instructions and operations necessary to implement the described invention may also be stored on the machine-accessible medium.

Thus a method and apparatus have been disclosed for authenticating a registry. While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method to detect tampering with registry settings in a computer, comprising:
    generating by an application program running in the computer a user identity value associated with a user identity that is authorized to change a system registry of the computer, the user identity value is generated by a one-way function;
    storing the user identity value;
    generating by the application program a registry security value associated with said system registry each time a system registry setting is changed within the application by an authorized user, the registry security value is generated by a one-way function;
    storing the registry security value;
    when reading from the system registry, generating a new registry security value, comparing the new registry security value with the stored registry security value and allowing processing to continue if the new registry security value is equal to the stored registry security value; and
    when monitoring the system registry for attempts to change the system registry, (1) prompting for user identity information and generating a new user identity value and comparing it with the stored user identity value, and (2) generating a new registry security value and comparing it with the stored registry security value, and if both of the new values match the stored values then allowing the user to make changes to the system registry.

2. A method as in claim 1, wherein generating a user identity value associated with a user identity comprises inserting at least one of a username and password in the one-way function to obtain the user identity value associated with the user identity.

3. A method as in claim 1, wherein generating a registry security value associated with a system registry comprises:
    concatenating system registry information; and
    inserting the concatenated system registry information in the one-way function to obtain the registry security value.

4. A method as in claim 3, wherein concatenating system registry information comprises concatenating at least one of system registry files and system registry handle keys.

5. A method as in claim 1 further comprising modifying the system registry in response to the new user identify and registry security values matching the stored values.

6. An article of manufacture comprising:
    a machine-accessible medium including instructions that, when executed by a machine, causes the machine to perform operations comprising
        generating a user identity value associated with a user identity that is authorized to access a system registry of said machine, the user identity value is generated by a one-way function;
        storing the user identity value;
        generating a registry security value associated with the system registry each time a system registry setting is changed by an authorized user;
        storing the registry security value;
        when reading from the system registry, generating a new registry security value, comparing the new registry security value with the stored registry security value and allowing processing to continue if the new registry security value is equal to the stored registry security value;
        when monitoring the system registry for attempts to change the system registry, prompting for user identity information and generating a new user identity value associated with a new user identity seeking access to the system registry and comparing the new user identity value to the stored user identity value;
        authenticating the system registry after reading the system registry; and
        applying a one-way function to the system registry settings as changed by the new user identity to obtain a new registry security value and storing the new registry security value for a subsequent authentication of the system registry.

7. An article of manufacture as in claim 6 wherein instructions for generating the user identity value associated with the user identity comprises further instructions for inserting at least one of the user's username and password in a one-way function to obtain the user identity value associated with the user identity.

8. An article of manufacture as in claim 6 wherein instructions for generating the registry security value associated with the system registry comprises further instructions for
    concatenating system registry information; and
    inserting the concatenated system registry information in a one-way function to obtain the registry security value.

9. An article of manufacture as in claim 8, wherein instructions for concatenating system registry information comprises further instructions for concatenating at least one of system registry files and system registry handle keys.

10. An article of manufacture as in claim 6 wherein instructions for authenticating the system registry after reading the system registry comprises further instructions for generating a new registry security value;

comparing the new registry security value with the stored registry security value; and allowing processing to continue if the new registry security value is equal to the stored registry security value.

11. An article of manufacture as in claim 6 further comprising instructions for modifying the system registry in response to the new user identity and registry security values matching the stored values.

12. An apparatus comprising:

a bus;

a data storage device coupled to said bus and that stores a plurality of instructions which implement an application program; and a processor coupled to said data storage device, said processor operable to receive said instructions which, when executed by the processor, cause the processor to generate a user identity value associated with a user identity that is authorized to change a system registry of said apparatus, the user identity value is generated by a one-way function;

store the user identity value;

generate a registry security value associated with said system registry each time a system registry setting is changed within the application by an authorized user;

store the registry security value;

when reading from the system registry, generate a new registry security value, compare the new registry security value with the stored registry security value and allow processing to continue if the new registry security value is equal to the stored registry security value; and when monitoring the system registry for attempts to change the system registry, (1) generate a new user identity value and compare it with the stored user identity value, and (2) generate a new registry security value and compare it with the stored registry security value, and if both of the new values match the stored values then allow the user to make changes to the system registry.

13. An apparatus as in claim 12, wherein the processor is operable to receive instructions which, when executed by the processor, cause the processor to, when generating a user identity value associated with a user identity insert at least one of the username and password in the one way function to obtain the user identity value.

14. An apparatus as in claim 12, wherein the processor is operable to receive instructions which, when executed by the processor, cause the processor to, when generating a registry security value associated with a system registry, concatenate system registry information; and insert the concatenated system registry information in a function to obtain the registry security value.

15. An apparatus as in claim 14, wherein the processor is to concatenate system registry information by concatenating at least one of system registry files and system registry handle keys.

16. An apparatus as in claim 12 wherein the processor is operable to receive instructions which, when executed by the processor, further cause the processor to modify the system registry in response to being provided a new user identity value and a new registry security value that match the stored values.

17. An article of manufacture as in claim 6 further comprising instructions for allowing processing to continue if the new user identity value is equal to the stored user identity value.

* * * * *